United States Patent
White et al.

(10) Patent No.: US 6,909,438 B1
(45) Date of Patent: Jun. 21, 2005

(54) VIDEO COMPOSITOR

(75) Inventors: Marvin S. White, San Carlos, CA (US); Stanley K. Honey, Palo Alto, CA (US); Walter Hsiao, Mountain View, CA (US); James R. Gloudemans, San Mateo, CA (US); Kevin R. Meier, Redwood City, CA (US); James McGuffin, Saratoga, CA (US); Richard H. Cavallaro, Mountain View, CA (US)

(73) Assignee: Sportvision, Inc., New York, NY (US)

( * ) Notice: Subject to any disclaimer, the term of this patent is extended or adjusted under 35 U.S.C. 154(b) by 664 days.

(21) Appl. No.: 09/767,777

(22) Filed: Jan. 23, 2001

Related U.S. Application Data

(60) Provisional application No. 60/180,436, filed on Feb. 4, 2000.

(51) Int. Cl.$^7$ ................................. G09G 5/00
(52) U.S. Cl. ........................................ 345/629
(58) Field of Search ........................ 345/549, 589, 345/591, 592, 593, 597, 600, 601, 602, 606, 629, 625, 626, 634, 639, 640, 572, 768

(56) References Cited

U.S. PATENT DOCUMENTS

| | | | |
|---|---|---|---|
| 3,580,993 A | 5/1971 | Sandorf et al. ................ 178/6 |
| 3,595,987 A | 7/1971 | Vlahos .................... 178/5.2 R |
| 3,840,699 A | 10/1974 | Bowerman ................ 178/6.8 |
| 3,973,239 A | 8/1976 | Kakumoto et al. ...... 340/146.3 |
| 4,064,528 A | 12/1977 | Bowerman ................... 358/22 |
| 4,067,015 A | 1/1978 | Mogavero et al. .......... 343/225 |
| 4,084,184 A | 4/1978 | Crain ......................... 358/93 |
| 4,100,569 A | 7/1978 | Vlahos ........................ 358/22 |
| 4,179,704 A | 12/1979 | Moore et al. ................ 358/22 |
| 4,319,266 A | 3/1982 | Bannister .................... 358/22 |
| 4,344,085 A | 8/1982 | Vlahos ........................ 358/22 |
| 4,386,363 A | 5/1983 | Morrison ..................... 358/22 |
| 4,409,611 A | 10/1983 | Vlahos ........................ 358/22 |
| 4,420,770 A | 12/1983 | Rahman ..................... 358/183 |
| 4,521,196 A | 6/1985 | Briard et al. ................ 434/20 |
| 4,589,013 A | 5/1986 | Vlahos et al. ............... 358/22 |
| 4,591,897 A | 5/1986 | Edelson ...................... 358/22 |
| 4,612,666 A | 9/1986 | King ........................... 382/32 |
| 4,625,231 A | 11/1986 | Vlahos ........................ 358/22 |
| 4,674,125 A | 6/1987 | Carlson et al. .............. 382/49 |
| 4,700,306 A | 10/1987 | Wallmander ............... 364/449 |
| 4,811,084 A | 3/1989 | Belmares-Sarabia et al. . 358/22 |
| 4,817,171 A | 3/1989 | Stentiford ................... 382/19 |
| 4,924,507 A | 5/1990 | Chao et al. .................. 382/31 |
| 4,950,050 A | 8/1990 | Pernick et al. ......... 350/162.13 |
| 4,970,666 A | 11/1990 | Welsh et al. ............... 364/522 |
| 4,975,770 A | 12/1990 | Troxell ........................ 358/96 |
| 4,999,709 A | 3/1991 | Yamazaki et al. .......... 358/160 |
| 5,063,603 A | 11/1991 | Burt ............................ 382/37 |
| 5,150,895 A | 9/1992 | Berger ..................... 273/29 R |
| 5,179,421 A | 1/1993 | Parker et al. ............... 356/152 |
| 5,184,820 A | 2/1993 | Keating et al. ......... 372/128 R |
| 5,207,720 A | 5/1993 | Sheperd ................. 273/128 R |
| 5,249,039 A | 9/1993 | Chaplin ...................... 358/22 |
| 5,260,695 A | * 11/1993 | Gengler et al. ............ 345/592 |
| 5,264,933 A | 11/1993 | Rosser et al. .............. 358/183 |
| 5,305,107 A | 4/1994 | Gale et al. ................. 548/590 |
| 5,313,304 A | 5/1994 | Chaplin ...................... 348/587 |
| 5,343,252 A | 8/1994 | Dadourian ................. 348/586 |
| 5,353,392 A | 10/1994 | Luquet et al. ............. 395/135 |
| 5,398,075 A | 3/1995 | Freytag et al. ............. 348/590 |
| 5,436,672 A | 7/1995 | Medioni et al. ............ 348/591 |
| 5,459,793 A | 10/1995 | Naoi et al. .................. 382/165 |
| 5,465,308 A | 11/1995 | Hutcheson et al. ......... 382/159 |
| 5,469,536 A | 11/1995 | Blank ......................... 395/131 |
| 5,488,675 A | 1/1996 | Hanna ........................ 382/284 |
| 5,491,517 A | 2/1996 | Kreitman et al. ........... 348/581 |
| 5,543,856 A | 8/1996 | Rosser et al. ............... 348/578 |
| 5,564,698 A | 10/1996 | Honey et al. ........... 273/128 R |
| 5,566,251 A | 10/1996 | Hanna et al. ............... 382/284 |
| 5,592,236 A | 1/1997 | Rosenbaum et al. ........ 348/586 |
| 5,610,653 A | 3/1997 | Abecassis ................... 348/110 |
| 5,627,915 A | 5/1997 | Rosser et al. ............... 382/219 |
| 5,668,629 A | 9/1997 | Parker et al. .......... 356/139.05 |
| 5,761,326 A | * 6/1998 | Brady et al. ................ 382/103 |
| 5,808,695 A | 9/1998 | Rosser et al. ............... 348/584 |
| 5,862,517 A | 1/1999 | Honey et al. ................ 702/85 |
| 5,892,554 A | 4/1999 | DiCicco et al. ............. 348/584 |
| 5,912,700 A | 6/1999 | Honey et al. ............... 348/157 |
| 5,917,553 A | 6/1999 | Honey et al. ............... 348/578 |

| | | | |
|---|---|---|---|
| 5,953,076 A | | 9/1999 | Astle et al. .................. 348/584 |
| 5,977,960 A | | 11/1999 | Nally et al. .................. 345/191 |
| 6,014,147 A | * | 1/2000 | Politis et al. ................ 345/620 |
| 6,014,472 A | | 1/2000 | Minami et al. ............. 382/285 |
| 6,094,511 A | * | 7/2000 | Metcalfe et al. ............ 382/260 |
| 6,100,925 A | | 8/2000 | Rosser et al. ................ 348/169 |
| 6,137,919 A | * | 10/2000 | Gonsalves et al. .......... 382/284 |
| 6,236,410 B1 | * | 5/2001 | Politis et al. ................ 345/440 |
| 6,266,100 B1 | * | 7/2001 | Gloudemans et al. ....... 348/587 |
| 6,542,162 B1 | * | 4/2003 | Hrusecky et al. ........... 345/629 |

FOREIGN PATENT DOCUMENTS

| | | |
|---|---|---|
| DE | 41 01 156 A1 | 1/1991 |
| SU | 1659078 A1 | 6/1991 |
| WO | WO 95/10915 | 4/1995 |
| WO | WO 95/10919 | 4/1995 |
| WO | WO 97/41683 | 11/1997 |
| WO | WO 98/24242 | 6/1998 |
| WO | WO 98/24243 | 6/1998 |
| WO | WO 98/28906 | 7/1998 |
| WO | WO 99/38320 | 7/1999 |
| WO | WO/00/14959 | 3/2000 |

OTHER PUBLICATIONS

"ESPN Introduces Sportvision's new "1st and Ten" technology for NFL games", Sportvision Company News Release, Sep. 24, 1998, p. 1, New York, NY.

"1st and Ten" innovation debuts on Sunday Night Football (ESPN release), Sportvision Company News Release, Sep. 24, 1998, p. 1, Bristol, CT.

"Sportvision's 1st and Ten to be used during Fiesta Bowl", Sportvision Company News Release, Dec. 21, 1998, p 1, New York, NY.

Replay 2000—The Ultimate Workstation for Sport Commentators and Producers, Orad Hi–Tec Systems, Apr. 1995.
SailTrack, GPS Tracking System for Animated Graphics Broadcast Coverage of the America's Cup Races, 1992.
SailTrack Technical Overview, 1992.
Sail Viz Software Documentation, 1992.
Ultimatte 400—The Technology That Revolutionized Broadcast Television.
Ultimatte Insider Card—Unit Specification, Ultimate Corporation, by Uichanco, et al., Oct. 14, 1999.
Ultimatte 9—Operating Manual, Mar. 1, 2000.
Ultimatte 400 Deluxe, ultimatte 400—Operating Manual, Oct. 1, 2000.

* cited by examiner

*Primary Examiner*—Mark Zimmerman
*Assistant Examiner*—Enrique L. Santiago
(74) *Attorney, Agent, or Firm*—Vierra Magen Marcus Harmon & DeNiro LLP

(57) ABSTRACT

A system is disclosed for blending two image that makes use of a color map which indicates colors in a foreground can be mixed with the background and how much of each source to mix. One embodiment of the invention restricts the use of the color map to only pixels in the foreground that correspond to a graphic (or effect) in the background. Another embodiment makes use of a gray scale matte which stores blending values for each pixel in the foreground.

49 Claims, 10 Drawing Sheets

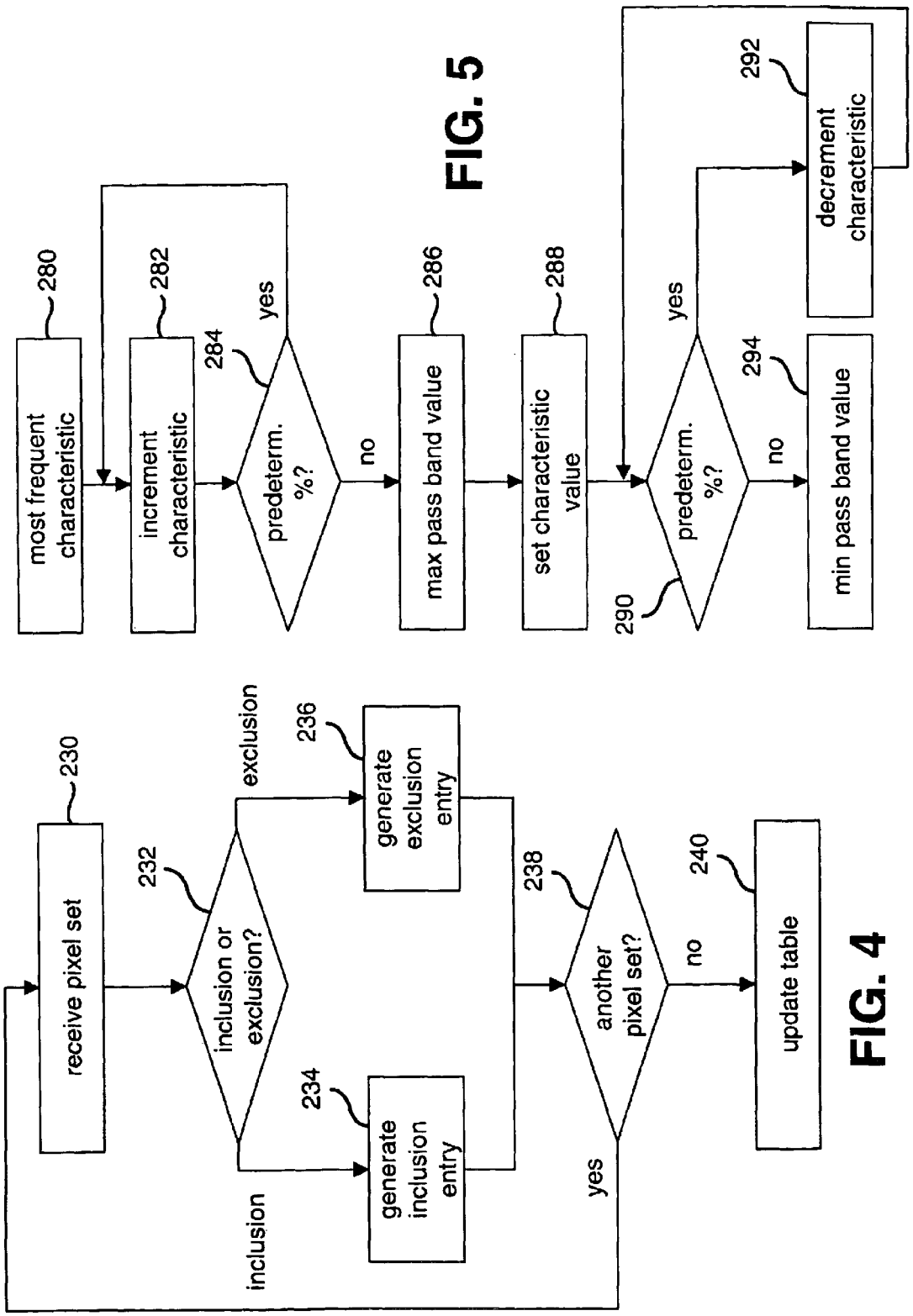

VIDEO COMPOSITOR

CROSS-REFERENCE TO RELATED APPLICATIONS

This Application claims the benefit of U.S. Provisional Application No. 60/180,436, VIDEO COMPOSITOR, filed on Feb. 4, 2000. That Provisional Application is incorporated herein by reference.

This Application is related to the following Applications:

SYSTEM FOR ENHANCING A VIDEO PRESENTATION OF A LIVE EVENT, by Gloudemans, et al., Ser. No. 09/160,534, filed Sep. 24, 1998.

BLENDING A GRAPHIC, by James R. Gloudemans, et al., Ser. No. 09/160,428, filed Sep. 24, 1998; and TELESTRATOR SYSTEM, by Meier, et al., Ser. No. 09/425,992, filed Oct. 21, 1999.

Each of these related Applications are incorporated herein by reference.

BACKGROUND OF THE INVENTION

1. Field of the Invention

The present invention is directed to a system for blending images.

2. Description of the Related Art

Many industries and applications have been using techniques for combining images. One example of a technique for combining images is chroma keying (also called blue screening). Chroma keying is a process which allows the creation of scenes that would otherwise be too dangerous, impossible or impractical and is one of the most popular special effects used in the motion picture, television and video industries today. Creating a composited image using chroma keying starts with the subject that has been photographed (still or video) in front of an evenly lit, bright, pure blue background. The image of the subject and the blue background is called the foreground. A matte is created which indicates the density and hue of the blue for each pixel in the foreground. The compositing process replaces all of the blue areas in the picture with another image known as the background. The new image created by chroma keying is called the composited image. Chroma key composites can be made for photos and/or videos. The matte is a grey scale image (in some instances a black and white image) that is used to determine the percentage of foreground and background values that will be used for each pixel in the composited image. The matte is also known as an alpha, alpha signal, key or key channel. The chroma keying process is typically performed using a keyer.

Originally, keyers used a non-additive mix. That is, keyers were devices that switched back and forth between the background and foreground to create a composited image. The limitation of this approach is that there is no way a transparent or translucent foreground subject can be added to the background scene in such a way that the background is still visible through the foreground subject. A viewer either sees the foreground object by itself or the background object by itself, depending on the switch. Also, since there is a switch involved, there is a limit to how fast the device can switch back between foreground and background.

The original keyers were then replaced by linear keyers, which combine (or key) the background and foreground in proportions determined by the level of the alpha signal, rather than simply switching between the foreground and background. A linear keyer can make a foreground object appear transparent. Some linear keyers perform an additive mix of the foreground and background. Other linear keyers will attenuate the foreground prior to blending with the background.

One problem with traditional linear keyers is they suffer from blue spill, which is the discoloration of the foreground subject caused by spill light from the blue background. One device which improved on traditional keyers is the Ultimatte from Ultimatte Corporation (www.ultimatte.com). The Ultimatte improves on linear keyers by processing the foreground in order to suppress the backing and remove blue spill, while at the same time permitting many shades of blue to be reproduced in the foreground.

One drawback with keyers, including the Ultimatte, is that they can only key on one color or one contiguous range of colors. That is, these keyers look for blue (or some other single color). Upon finding the color being searched for, the device keys in the background to replace the foreground pixels. Additionally, traditional keyers do not look at the background when determining keys. One disadvantage of not looking, at the background is that if there is no background to replace the foreground, it is not useful to waste resources calculating an alpha.

Another system that has been used to combine images is the famous and successful $1^{ST}$ & Ten™ virtual yardline system, developed by Sportvision, Inc. (www.sportvision.com). This system adds a virtual first down line to a television broadcast of an American football game. The system first determines where in a video the line should be added. The line is then rendered in a separate frame or field of video. The program video (e.g. showing the football game) is analyzed to determine which pixels can be replaced by the line. The image of the line is then blended with the appropriate pixels of the program video. The determination of how to blend pixels is based on a combination of the program video with prestored color information. That is, an operator has previously determined which colors may be modified in a video. For example, the operator may determine that green relating to the grass, white relating to chalk, and brown relating to dirt can be modified, while colors in the players' uniforms cannot be modified. This system presents an improvement over the prior art because it allows the user to designate many colors to be replaced rather than one color.

The $1^{ST}$ & Ten™ system analyzes the program video to create an alpha signal using a computer. Using a computer is not optimal. For example, the computer must process the pixels in a frame at the normal NTSC frame rate of thirty frames per second. As such, the system is not able to process every pixel in the foreground frame. Thus, the graphic is added as a series of polygons and only pixels pertaining to certain portions of the polygons are considered when determining the alpha signal. Additionally, because of the timing, the graphic being added to the program feed is limited in number of pixels.

Thus, there is a need for an improved system for combining images.

SUMMARY OF THE INVENTION

The present invention, roughly described, provides for a system for blending two images, such as blending one video source with another video source, blending a still image with a video source, blending a still image with a still image, etc. For purposes of this document, the terms blending and mixing are used interchangeably. Examples of use of the present invention include inserting a virtual advertisement into a video, inserting a graphic effect into a video, adding an image of a person into an image of a background (e.g. for weather reports, etc.), etc. The system makes use of a color map which indicates which colors in an image can be mixed with another image, and how much of each source to include. A color map is a database which stores identifications of colors and blending information for the colors. The blending information can be alpha values for a keyer, data to determine alpha values or other information indicating how to blend pixels of the corresponding color. One embodiment of the present invention restricts the use of the color map to only pixels in the image that overlap (or correspond) in position with the graphic (or other effect). A pixel is an element of an image. An image is made up of many pixels. In some formats (but not necessarily all), a pixel is the smallest division that makes up the raster scan line. Pixels can be square, rectangular, or other shapes.

One embodiment of the present invention includes the steps of receiving a first video signal and receiving a second video signal. The first video signal includes a first set of pixels and the second video signal includes a second set of pixels. The method includes determining a set of blending values based on a color map and on color of the pixels of the first set of pixels. The method continues by blending the first set of pixels with the second set of pixels based on the blending values. In one embodiment, blending value determined for each pixel of the first video signal that overlaps in position with an image in the second video signal. In another embodiment, a blending value determined for each pixel of the first video signal. In one implementation, a gray scale matte signal is created based on the color map. Each pixel of the matte signal represents a blending value for the first video signal. In one implementation, the method is performed in real time during a live event. In other implementations or uses, the method is not performed in real time.

One implementation of the current invention includes a compositor which receives a program video signal, an effect video signal, a control alpha signal and updates to a color map. Based on the stored color map and the control alpha signal, the compositor mixes the program video signal with the effect video signal to create a composited image. One embodiment of the compositor includes a pixel blending value calculation circuit which receives the first video image. The pixel blending value calculation circuit accesses the color map and generates an output based on colors in the first video signal and the color map. The compositor also includes a blending circuit which receives the first video image and the second video image. The blending circuit is connected to the pixel blending value calculation circuit and mixes the first video signal with the second video signal based on the output of the pixel blending value calculation circuit.

One embodiment of the blending circuit includes a first video signal altering circuit, a second video altering circuit, control logic and a video blending circuit. The control logic sends data to the altering circuits to alter the components of the foreground and background video signals. The altered components of both the foreground and background signals are sent to the video blending circuit which mixes the two altered signals. In one embodiment, the signals are mixed by adding the signals.

One embodiment of the pixel blending value calculation circuit includes a memory, a processor, a video interface and one or more communication interfaces, all of which are connected by a bus. The processor receives the first video signal, accesses the color map based on the colors in the first video signal, and reports the blending value based on the accessing of the color map.

The present invention can be accomplished using hardware, without any software. The present invention can also be implemented using a combination of both hardware and software. The software used for the present invention is stored on one or more processor readable storage media including hard disk drives, CD-ROMs, optical disks, floppy disks, RAM, ROM or other suitable storage devices. In alternative embodiments, some or all of the software can be replaced by dedicated hardware including custom integrated circuits, gate arrays, FPGAs, PLDs, and special purpose computers. In another alternative, the present invention can be implemented using software on a general purpose computer.

These and other objects and advantages of the present invention will appear more clearly from the following description in which the preferred embodiment of the invention has been set forth in conjunction with the drawings.

BRIEF DESCRIPTION OF THE DRAWINGS

FIG. 4 is a flow chart describing one embodiment for establishing inclusions and/or exclusions.

FIG. 5 is a flow chart describing the step of creating an entry of an exclusion or inclusion for storage in the color map.

DETAILED DESCRIPTION

Figure 1:
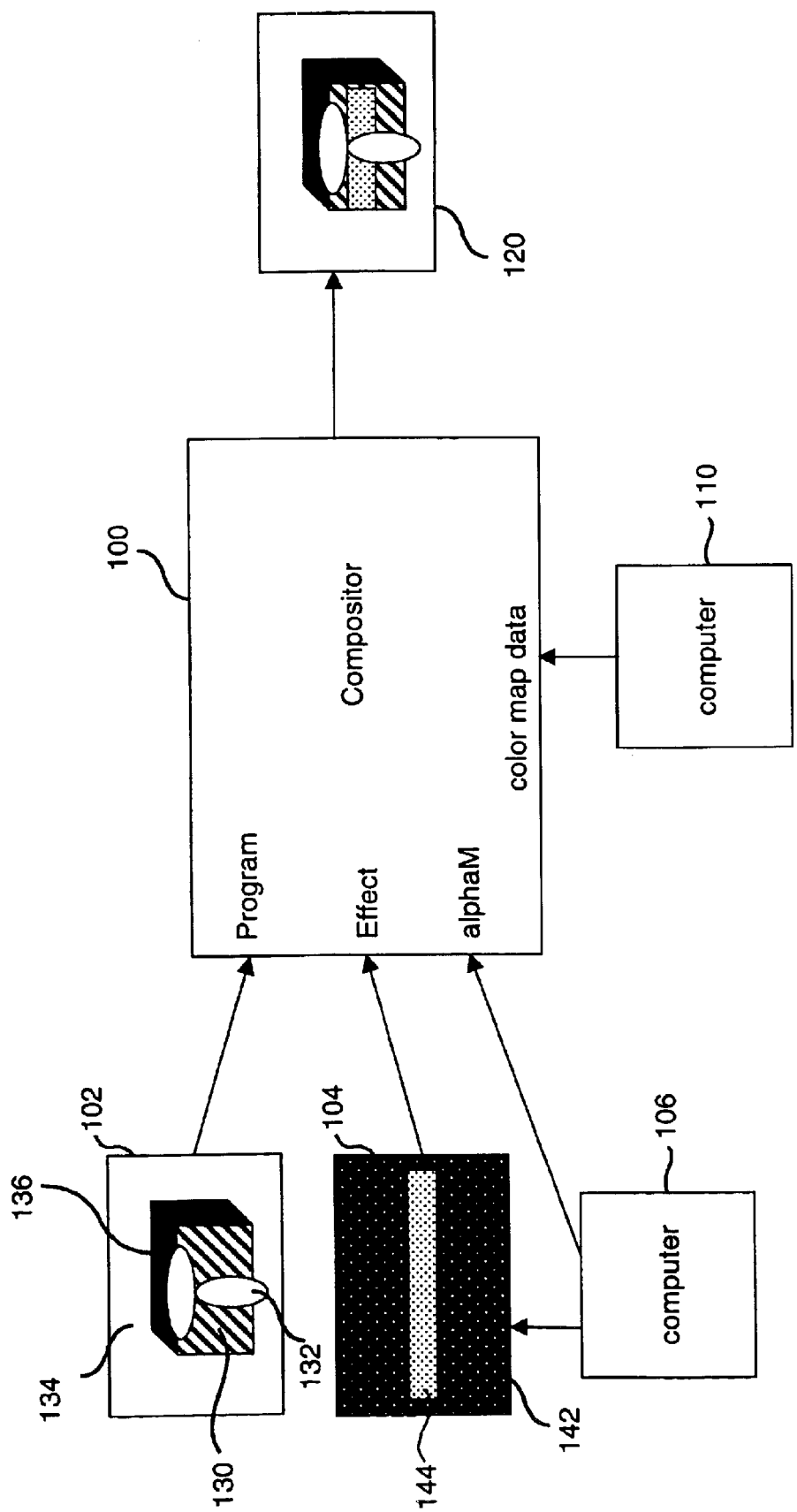
FIG. 1 is a block diagram describing one embodiment of the present invention.

FIG. 1 shows one embodiment of the present invention. Compositor 100 receives four inputs and provides one output. The first input received by compositor 100 is program video signal 102. Shown in FIG. 1 is one frame of video (used for exemplar purposes) of program video signal 102. Throughout the discussion herein, instead of a frame of video, a field of video or a still image can also be used. The second input received by compositor 100 is effect 104, which can be video or a still image to be mixed with program video signal 102. Shown in FIG. 1 is one frame of video for effect 104. The third input to compositor 100 is alphaM, which is received from computer 106. The fourth input to compositor 100 includes updates to a color map (described below). The output of compositor 100 is a composited image representing a blending of program video signal 102 with effect 104.

In the discussion above with respect to keyers, the inputs to the keyers were referred to as foreground and background. These labels were used for convenience and are not necessary for the present invention. However, for purposes of consistency, it is assumed that program video 102 is the foreground and effect 104 is the background. Other labels will also work with the present invention.

In one embodiment, effect 104 is generated by computer 106. In alternative embodiments, effect 104 can be generated by other hardware, cameras, sensors, etc. Examples of effect 104 include graphics or images (e.g. a line, other shapes, etc.), a virtual advertisement, text, etc.

The signal alphaM is also known as a control alpha or a geometric alpha AlphaM can be used to modify how the effect is blended into the program video without taking into effect the color in the program video. In one embodiment, alphaM can be used to prevent compositor 100 from blending video signals based on the color map In one example, alphaM is a value between zero and one for each pixel and each frame. Note that alphaM is optional and some embodiments do not make use of alphaM.

Compositor 100 stores a color map. In one embodiment, the color map identifies a set of colors and an alpha for each of the identified colors. The alpha is a blending value to be used to mix the program signal with the effect signal. In summary, compositor 100 will look at the color of a particular pixel in program video signal 102. The color will be used to access the color map to determine the alpha for the particular color. That determined alpha will be used to mix the corresponding pixel of effect 104 with the pixel of program video signal 102. In some embodiments, the color of a pixel is a multi-dimensional value, for example, the color could include a Red value, a Green value and a Blue value. Other color formats can also be used.

Computer 110 is used to generate the color map and to communicate the color map information to compositor 100. The color map can be generated prior to using compositor 100 and/or can be generated during use of compositor 100. In one embodiment, the color map can be updated during the use of compositor 100. The result of blending program video signal 102 with effect 104 is to create composited video 120.

In FIG. 1, program video signal 102 is depicted to include a number of colors represented by different shading. For example, program video signal 102 includes colors 130, 132, 134 and 136. For exemplar purposes, assume that the color map provides blending value information that indicates that for pixels of color 130, a pixel of effect 104 should replace the corresponding pixel in program video 102. Also assume that the color map indicates that for pixels of colors 132, 134 and 136, pixels of effect 104 should not replace pixels of the program video. In this example, the alpha for color 130 is one and the alpha for colors 132, 134 and 136 is zero. Alphas between zero and one could also be used for blending. Effect 104 has two colors 142 and 144. Color 142 is used as a backdrop and color 144 is used to create a horizontal line (the effect). In one example, color 142 is transparent. By transparent, it is meant that it is a unique color value or an illegal television/movie color code used only as a signal to the invention. In one embodiment, the transparent color is black. The unique color may not be used as part of the line (or other effect). Use of the transparent color provides a geometric keying effect so that the program video is altered only where effect 104 is non-transparent. Where the effect is non-transparent and the alpha in the color map allows for blending, the effect will be mixed with program video signal 102. As can be seen from composited video 120, the horizontal line of color 144 in effect 104 is mixed into program video 102 so that it only replaces pixels of color 130. The remaining pixels of program video signal 102 are unchanged. In one embodiment, it is not necessary to use a unique color because the signal alphaM will be used to indicate where and where not to consider blending.

Table 1 below describes the action of one embodiment of compositor 100.

TABLE 1

| Program Video Pixel | Effect Pixel | Composited Video |
| --- | --- | --- |
| Any | Transparent | Program pixel |
| Any | Non-Transparent | F (program pixel, effect pixel, Color Map (program pixel), alphaM) |

Thus, when a pixel from effect 104 is transparent, the pixel for composited video 120 is the pixel from the program pixel. If the pixel from effect 104 is non-transparent, the pixel for composited video 120 is a function F( ) of the program video pixel, the effect pixel, the value returned from the color map based on the program video pixel, and alphaM.

In one embodiment, the color map stores a blending value for every possible video color. In other embodiments, the color map stores blending value information that can be used to determine a blending value for all or a subset of colors. The color map can be indexed in YUV space, YCrCb space, RGB space, YIK, YDbDr, PhotoYCC, HSI, HIS, HSV, CMYK, (or other color space). In one alternative, the color map uses 24 bits per color (or some other amount depending on the desired resolution). In one embodiment, the color map includes 16 Mbytes of memory, with one byte per entry (or some other number depending on the desired resolution). The color map is loadable from computer 110 and can be modified in real time without a full reload or with a full reload.

Figure 2:
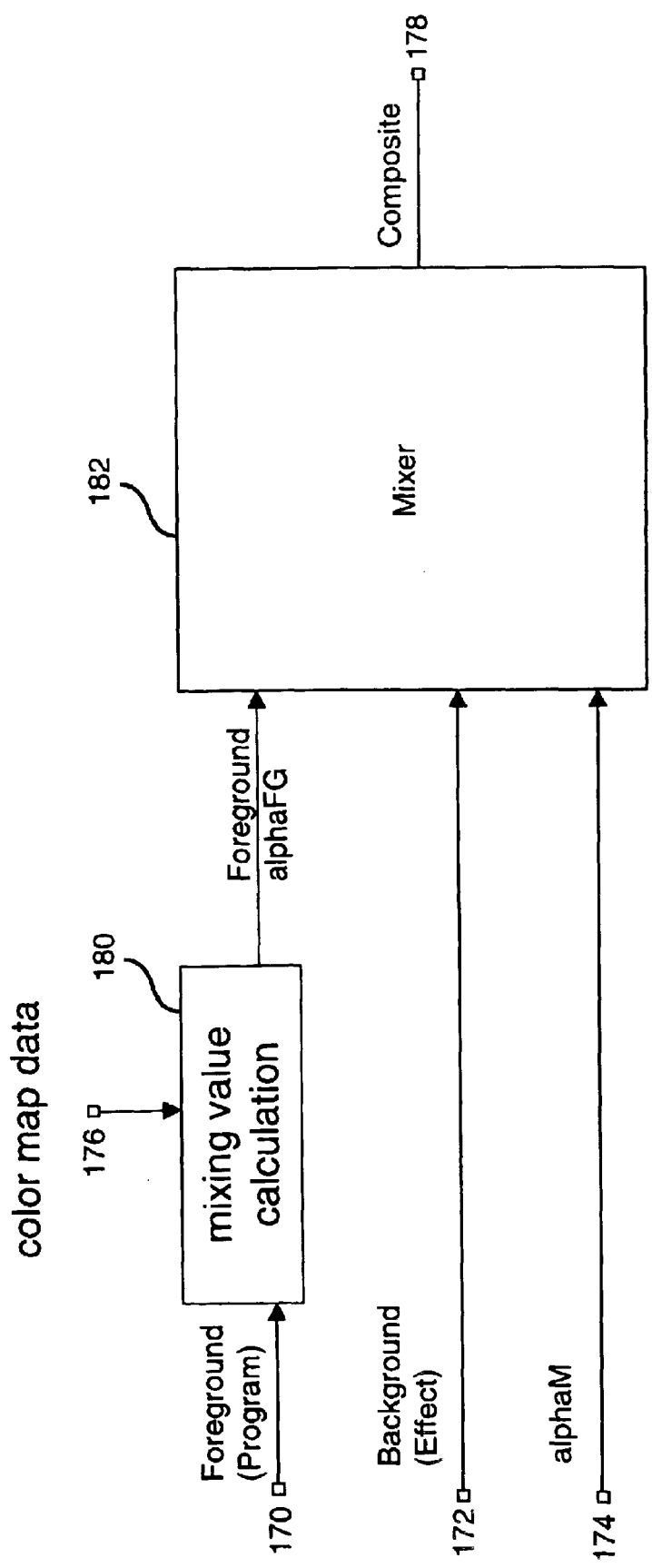
FIG. 2 is a block diagram describing details of one embodiment of the compositor of the present invention.

FIG. 2 is a block diagram depicting one embodiment of the components of compositor 100. Depicted in FIG. 2 are five connectors 170, 172, 174, 176 and 178. These are video signal connectors for communicating signals. Connector 170 receives the foreground or program video signal 102. Connector 172 receives the background or effect 104. Connector 174 receives the alphaM signal from computer 106. Connector 176 receives the color map data from computer 110. In one embodiment, connectors 174 and 176 can be serial or other types of connections. Connector 178 is a video connector for communicating the composited video 120, In some embodiments, the connectors 170–178 may each be multiple physical connectors, with one physical connector per video component (e.g. R, G, B).

The foreground or program video from connector 170 and color function information from connector 176 are communicated to pixel mixing value calculation circuit 180. In one embodiment, pixel mixing value calculation circuit 180 stores the color map and looks at the foreground signal pixel by pixel. For each pixel, or some subset of pixels, pixel mixing value calculation circuit 180 accesses the color map and uses the information from the color map to assign a blending value to the particular foreground pixel based on the color of the foreground pixel. The blending value is denoted in the drawings as alphaFG. In one embodiment, if there is no information in the color map for the particular pixel color under consideration, then alphaFG is set to zero, or another predetermined value. If there is information in the color map for the particular pixel color under consideration, then alphaFG is set accordingly. After determining alphaFG for the particular pixel, the alphaFG value and the foreground pixel data are communicated from pixel mixing value calculation circuit 180 to mixer 182.

Mixer 182 also receives the background video signal from connector 172 and alphaM from connector 174. The foreground signal, the background signal, alphaFG and the alphaM signal are received by mixer 182 on a pixel-by-pixel basis. However, the signals can be received in a format other than a pixel-by-pixel basis. After receiving the foreground pixel, the background pixel, alphaFG and-alphaM, mixer 182 mixes the foreground with the background according to the following equations.

> FG = foreground (program) pixel
> BG = background (effect) pixel
> C = composited pixel
> (eq. 1)
> If ($0 \leq$ alphaM $\leq 0.5$)
> alpha = alphaFG * 2 * (0.5 - alphaM)
> else (0.5 <alphaM $\leq 1$)
> alpha = 2 * (alphaM - 0.5)
> (eq. 2)
> C = (1 - alpha) * FG + (alpha) * BG In one embodiment, part of the calculation of eq. 1 can be performed by computer 106. In another embodiment, the color map is not accessed if (0.5<alphaM$\leq$1). In yet another embodiment, alphaM can be two or three signals. For example, alphaM1 can be 2 alphaM and alphaM2 can be 2×(alphaM−0.5). A third input could indicate whether to use alphaM1 or alphaM2. In alternative embodiment, compositor 100 comprises one or more computers, with each computer having one or more processors, memory, non-volatile storage, I/O (e.g. network cards, monitors, printers, communication ports, keyboards, pointing devices, etc.) and a video card. The processors can be standard programmable processors, custom printed circuit boards, custom integrated circuits, other dedicated hardware or a combination thereof.

Figure 3:
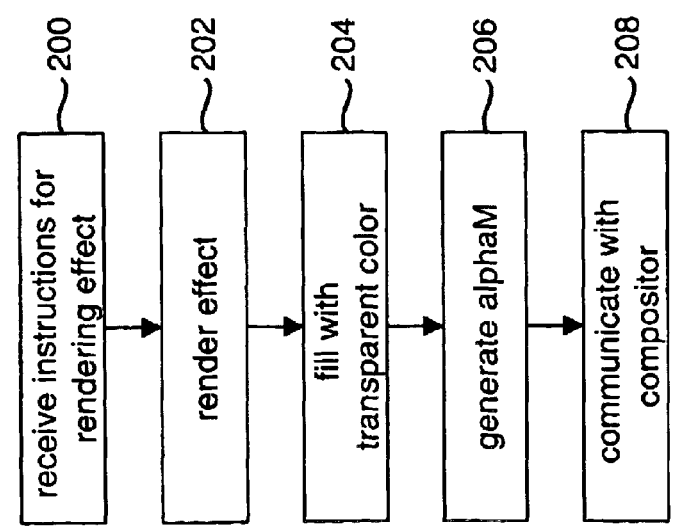
FIG. 3 is a flow chart describing the steps performed to generate an effect to be used by the compositor of the present invention.

FIG. 3 is a flow chart which describes the steps performed by computer 106 to provide the effect and alphaM. In step 200, computer 106 receives instructions for rendering the effect. The effect could be a virtual advertisement, a line, a shape, text, etc. Many systems known in the art, including those systems described in the patent documents incorporated by reference, explain systems for providing information to create a graphic effect. In step 202, computer 106 renders the effect, which could include rendering a field (or frame) of video. Note, in one embodiment, the steps of FIG. 3 can be performed by multiple computers. It is contemplated, that the graphic or effect to be added to the program video may not take up the entire frame or field of video. Thus, in step 204, the portion of the frame or field of video that is not utilized for the graphic or effect is filled in with the transparent color. In step 206, computer 106 will generate alphaM. Note that if (0.5<alphaM$\leq$1), then mixer 182 does not take into account data from the color map. If (0<alphaM<0.5), then mixer 182 does take into account data from the color map. If alphaM is equal to 0.5, then mixer 182 ignores the background pixel (the effect) and passes the foreground (program) pixel to the composited image. If alphaM is equal to zero, then mixer 182 mixes the foreground with the background according to alphaFG. Any value of alphaM above zero and below 0.5 modifies the mix intended by alphaFG. A value of alphaM equal to 1 causes mixer 182 to ignore the foreground pixel and pass the background pixel (effect) to the composited image. Thus, computer 106 can use alphaM to force the background pixel to be used, force the foreground pixel to be used, or bias the blending. In one embodiment, the biasing of the blending due to alphaM is performed by an operator changing the blending effect for artistic, business or other purposes unrelated to the color of the pixel. In another embodiment, computer 106 will look at each pixel of the effect 104. If the pixel color is transparent, then computer 106 sets alphaM to equal 0.5 thereby forcing the composited pixel to be the foreground pixel. After generating alphaM in step 206, computer 106 communicates with compositor 100 in step 208. In one embodiment, pixel values for effect 104 and alphaM are communicated on a pixel by pixel basis with the corresponding pixels for the effect 104 and alphaM being presented at the same time. In another embodiment, the values for alphaM are used to create filed or frame of a gray level matte signal.

Prior to an event, an operator can set up inclusions and exclusions. An inclusion is a color range for a pixel in the foreground that can be mixed using the present invention. An exclusion is a color range for a pixel in the foreground that should not be mixed using the present invention. During operation, the operator can set up one or more inclusions and/or one or more exclusions. For example, the operator may decide that a graphic can be drawn over green (grass) and brown (dirt), so inclusions for green and brown are created. Thus, the system can store blending information for two or more visibly distinct colors (e.g. green and brown). Additionally, the operator may want to set up an exclusion so that a line is not drawn over a specific color (e.g. team's uniforms). It is possible to allow drawing over one shade of green (grass) and not allow drawing over a second shade of green (team's shirt color). In an alternate embodiment of the present invention, exclusions and inclusions can also include video frame pixel positions or real world locations that are not to be enhanced. The process of setting up inclusions and exclusions is performed using computer 110.

FIG. 4 depicts a flow chart describing the process of creating inclusions and exclusions. In one embodiment, a camera is panned and tilted to point to the different areas of the event. The operator can view the output of the camera on a monitor and, using a pointing device (e.g. a mouse), select areas for inclusion (create an inclusion filter) or exclusion (create an exclusion filter). For example, the operator could choose patches of shady grass, sunny grass and dirt for inclusions. The operator may choose portions of the players' uniforms as exclusions.

When setting up inclusions and exclusions, computer 110 first receives a set of pixels in step 230. In one embodiment of the present invention, the pixel set received is from the output of one of the video cameras. For example, a pixel set can include selected pixels from an image of the playing field, selected pixels from an image of one of the teams' uniforms, or other images. In another embodiment, the pixel set can be received from a stored image.

Once the pixel set is received, the operator of computer 110 determines whether the pixel set is to be used for identifying exclusion pixels or identifying inclusion pixels in step 232. In one embodiment, an operator uses a GUI to indicate whether the pixel set is for an inclusion or an exclusion, and to indicate the alphaFG (or other blending value) for the inclusion/exclusion. If it is determined that the pixel set has been received for establishing criteria for exclusion pixels, then computer 110 generates an exclusion entry in step 236. If it is determined that the pixel set has been received to establish criteria for inclusion pixels, then computer 110 generates an inclusion entry in step 234. Multiple inclusion filters and exclusion entries can be generated.

In one embodiment of the present invention, computer 110 generates inclusion filters and exclusion entries by generating a set of histograms characterizing the received sets of pixels. For example, an inclusion entry may include an R histogram, a G histogram and a B histogram, all of which describe the inclusion entry in RGB color space, The R characteristic histogram has a horizontal axis representing red color values and a vertical axis representing the number of pixels in the received pixel set that corresponds to each value. The G characteristic histogram has a horizontal axis representing green color values and a vertical axis representing the number of pixels in the received pixel set that corresponds to each value. The B characteristic histogram has a horizontal axis representing blue color values and a vertical axis representing the number of pixels in the received pixel set that corresponds to each value. Each histogram has a respective pass band that defines the R, G or B characteristics that a pixel must have to be an inclusion pixel. Accordingly, a pixel will be designated as an inclusion pixel when the filter is applied and the pixel has an R characteristic value within the R pass band, a G characteristic value within the G pass band, and a B characteristic value within the B pass band. Exclusion entries work in a similar manner.

FIG. 5 illustrates a sequence of operations performed by computer 110 to determine a pass band for an inclusion entry histogram or an exclusion entry histogram. In the embodiment using RGB, the steps of FIG. 5 are performed for each of the three histograms. First, computer 110 identifies the most frequently occurring value for the characteristic (R, G, or B) represented by the histogram in step 280. For example, step 280 looks for the red value having the most number of pixels with that red value. Next, the characteristic value is incremented in step 282. It is then determined whether the number of pixels having the resulting characteristic value is within a predetermined percentage of the number of pixels having the most frequently occurring characteristic value (step 284). In one embodiment of the present invention, the predetermined percentage employed in step 284 is 10 percent for an inclusion entry and 50 percent for an exclusion entry.

If it is determined that the number of pixels with the characteristic value is above the predetermined percentage, then the characteristic value is incremented in step 282 and a new comparison is performed. If it is determined that the number of pixels with the characteristic value is not above the predetermined percentage, then the maximum characteristic value for the pass band is set in step 286 to be equal to the last characteristic value with a number of pixels above the predetermined percentage.

Once the maximum pass band characteristic value is set, the characteristic value is set to be equal to the characteristic value just below the most frequently occurring characteristic value instep 288. It is then determined whether the number of pixels having the resulting characteristic value is above a predetermined percentage of the number of pixels having the most frequently occurring characteristic value (step 290). In one embodiment of the present invention, the predetermined percentage employed in step 290 is one percent for an inclusion entry and twenty five percent for an exclusion entry. In another embodiment of the present invention, the predetermined percentage employed in step 290 is 10 percent for an inclusion entry and 50 percent for an exclusion entry.

If it is determined that the number of pixels with the characteristic value is above the predetermined percentage, then the characteristic value is decreased in step 292 and a new comparison is performed. If it is determined that the number of pixels with the characteristic value is not above the predetermined percentage, then the minimum characteristic value for the pass band is set in step 294 to equal the last characteristic value with a number of pixels above the predetermined percentage of the number of pixels representing the most frequently occurring characteristic value. In an alternative embodiment, all pixel colors from the pixel set are included in the inclusion/exclusion.

Although the generation of an inclusion entry and exclusion entry has been described with respect to forming a histogram, one of ordinary skill in the art will recognize that it is not necessary to actually form a graphical image of a histogram. A table of data is maintained that reflects the Red ("R"), Green ("G") or Blue ("B") data. It will also be recognized that the percentage thresholds identified above are not the only percentages that may be employed. Any number of percentages may be employed, depending upon the resolution that is desirable for the entry. One with ordinary skill in the art will further recognize that other methods can be employed for generating inclusions and exclusions. For example, a color region or set of color regions can be selected for inclusion or exclusion using a chromacity diagram.

After the inclusion/exclusion entries are created, a color map is created. One example of a color map is a database with a record for each possible color based on R, G and B values. In an alternative embodiment, less than all of the possible colors are represented in the color map. For each color in the color map, the database stores blending value information. The stored blending value information could be a number between zero and one hundred, zero and one, or another suitable range. The stored number need only designate an amount of blending for that particular color.

In one embodiment, the stored blending value information is a number between 0 and 255. When the operator selects a pixel set for an inclusion or an exclusion, the operator is asked to provide a percentage between zero and one hundred percent. The number provided by the operator is converted to a scale of 0–255. The converted number is stored as the blending value for each color described by the inclusion/exclusion entry (e.g. each color within the pass bands of the entry). In one embodiment, the color map can include a set of equations for defining a blending value for a color.

Alternatively, minimum and maximum values for a pass band can be stored in color map 320. For each minimum and maximum value, a blending value is stored. The system will check the R, G and B values to see if they fit with any of the pass bands. If they fit within a particular pass band, the system will access the blending value for that particular pass band. Instead of storing an entire pass band, the color map could store the center color for each pass band. Processor 314 will look for the closest center color to the particular pixel color under consideration. In one embodiment, interpolation is used to create a blending value based on that particular pass band center point. In one option for interpolation, if the color of the current pixel is within a certain percentage of the center color, then the full blending value is used. If it is greater than a certain distance from the center, then a percentage of the blending value is used, and so on.

In one embodiment, a taper zone is set up. The taper zone includes colors outside of but near the pass bands for a filter. One method for determining the colors in the taper zone is to create an additional set of pass bands (in addition to the inclusion pass bands) in the same manner as described above, but use different percentages so that the pass bands are wider. Those colors in the new pass bands but not in the inclusion pass bands are in the taper zone. The colors in the taper zone closest to the inclusion pass bands are given a blending value equal to or slightly lower than the blending value given to the colors in the inclusion pass bands. The colors in the taper zone farthest from the inclusion pass bands are given a blending value indicating that no blending should occur. The colors in between are given blending values based on linear interpolation. An analogous method is used for taper zones near exclusions. The blending value for the colors in the taper zones are stored in the color map.

Figure 6:
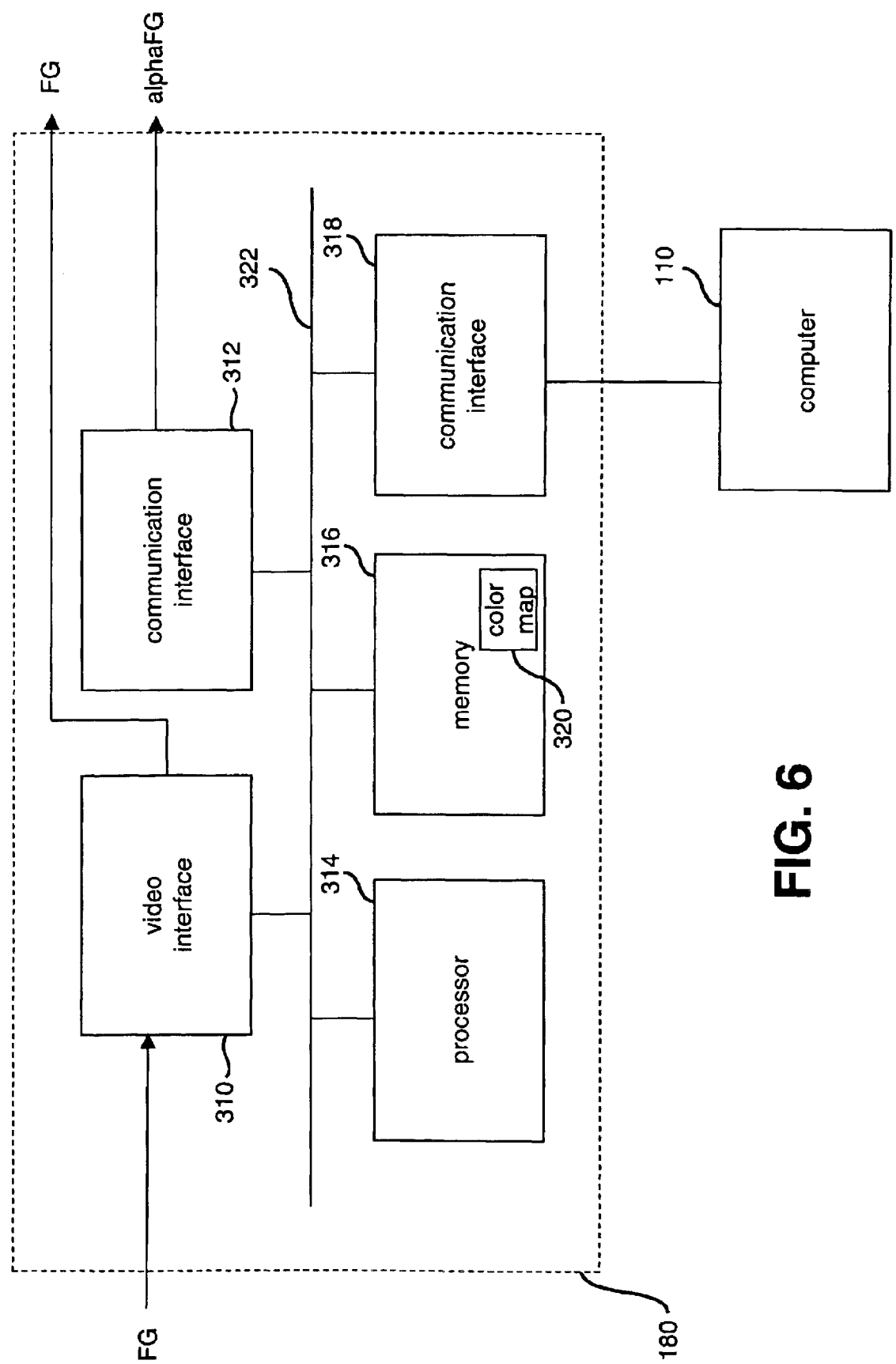
FIG. 6 is a block diagram of one embodiment of a pixel blending value calculation circuit.

FIG. 6 is a block diagram of one embodiment of pixel blending value calculation circuit 180. FIG. 6 shows video interface 310, communication interface 312, processor 314, memory 316 and communication interface 318 all connected to bus 322. Video interface 310 receives the foreground (or program video signal). In one embodiment, the video signals are digital video signals. Alternatively, analog signals can be received and converted to digital signals. Video interface 310 receives the foreground video signal and provides digital data to processor 314. Video interface 310 can be a standard interface chip or board known in the art. Communication interface 318 provides a serial interface with computer 110. Alternatively, computer interface 318 can provide a parallel interface, a USB port interface, a network interface, (e.g. Ethernet) etc. Communication interface 312 receives the calculated alphaFG value from processor 314 and communicates it to mixer 182. In one embodiment, communication interface 312 is a serial port, parallel port, USB port, etc. Alternatively, communication interface 312 can be a set of wires and a register, a latch, etc. Memory 316 stores code for programming processor 314 and stores the color map 320. Updates to color map 320 are provided from computer 10 via communication interface 318.

For a given pixel, processor 314 receives R, G and B values and accesses color map 320 to determine alphaFG. In one embodiment, determining alphaFG includes using the R value, G value and B value to access an entry in the color map which stores the alphaFG value. Regardless of the scheme used for storing a color map, color map 320 stores the information used by processor 314 to present an alphaFG to communication interface 312.

Figure 7:
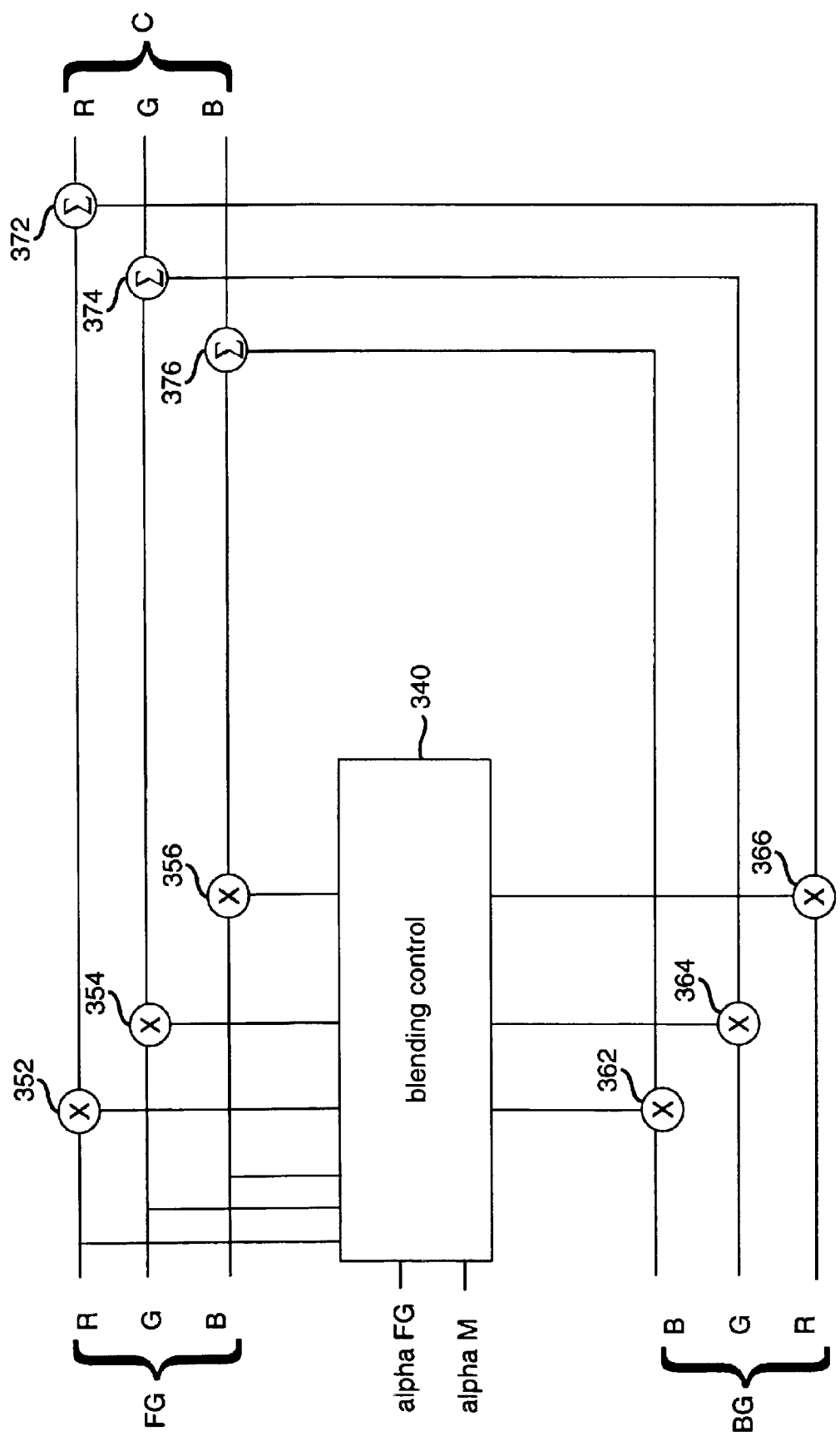
FIG. 7 is a block diagram of one embodiment of a blending circuit.

FIG. 7 is a block diagram describing one example of blending circuit 182. Blending control logic 340 receives alphaFG from communication interface 312 (FIG. 6) and alphaM from connector 174 (FIG. 2). Blending control logic 340 can be a processor and support logic, a full computer, an FPGA, a hardwired circuit, etc. Altering circuit 352 receives the R component of the foreground. Altering circuit 354 receives the G component of the foreground. Altering circuit 356 receives the B component of the foreground. Altering circuit 362 receives the B component of the background. Altering circuit 364 receives the G component of the background. Altering circuit 366 receives the R component of the background.

Based on the values of alphaFG and alphaM, blending control logic 340 determines alpha of eq. 1. Blending control logic 340 communicates alpha to altering circuits 362,364 and 366. The value of (1−alpha) is communicated to altering circuits 352, 354 and 356. In one embodiment, altering circuits 352, 354 and 356 are multipliers. In other embodiments, altering circuits 352, 354 and 356 are addition circuits. Other embodiments of blending control logic 340 also receive the R, G and B values to derive the blending variables for the altering circuits.

The output of altering circuit 352 and the output of altering circuit 366 are communicated to blending circuit 372. The output of altering circuit 354 and altering circuit 364 are communicated to blending circuit 374. The output of altering circuit 356 and altering circuit 362 are communicated to blending circuit 376. In one embodiment, blending circuits 372, 374 and 376 mix the video signals by adding the inputs. A saturated add is also possible and reasonable. In one embodiment, blending circuit 372 adds the output from altering circuit 352 to the output of altering circuit 366. Blending circuit 374 adds the output of altering circuit 354 to the output of altering circuit 364. Blending circuit 376 adds the output of altering circuit 356 to the output of altering circuit 362. The output of blending circuit 372 is the red component of the composited signal. The output of blending circuit 374 is the green value of the composited signal. The output of blending circuit 376 is the blue component of the composited signal. In one embodiment, the pixel mixing value calculation circuit and the mixer can be implemented by programming one or more general purpose computers or processors with support logic.

Figure 8:
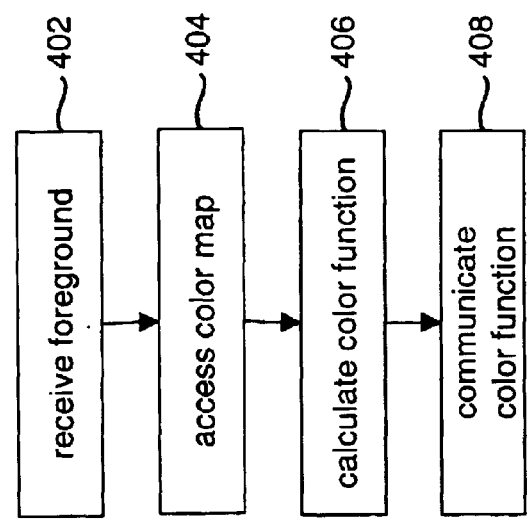
FIG. 8 is a flow chart describing the steps performed by the pixel blending value calculation circuit.

FIG. 8 is a flow chart which describes the steps performed by the pixel mixing value calculation circuit of FIG. 6. In step 402, video interface 310 receives the data for the foreground pixel and provides that data to processor 314. In step 404, processor 314 accesses color map 320 based on the received foreground pixel. In step 406, processor 314 determines alphaFG based on color map 320. In step 408, processor 314 transmits alphaFG to blending control logic 340 via communication interface 312.

Figure 9:
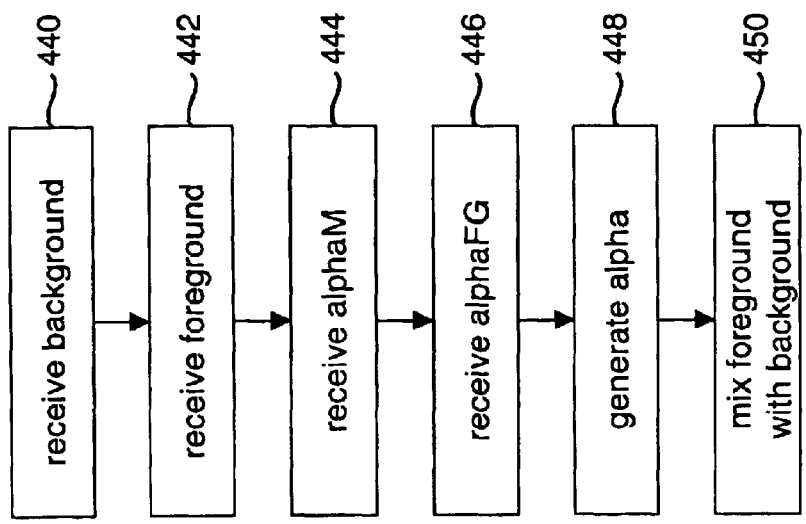
FIG. 9 is a flow chart describing the steps performed by the blending circuit.

FIG. 9 provides a flow chart for the steps performed by the mixer of FIG. 7. In step 440, the background pixel is received by altering circuits 362, 364 and 366. In step 442, the foreground pixel is received by altering circuits 352, 354 and 356, as well as blending control logic 340 (in some embodiments). In step 444, blending control logic 340 receives alphaM. In step 446, blending control logic 340 receives alphaFG from processor 314. In step 448, blending control logic 340 generates alpha and (1−alpha) for altering circuit 352, 354, 356, 362, 364 and 366. In step 450, the outputs of the altering circuits are mixed by blending circuits 372, 374 and 376. Note that in one embodiment, altering circuits 352–366 can be combined into one circuit. Similarly, blending circuits 372, 374 and 376 can be designed as one combined circuit.

Figure 10:
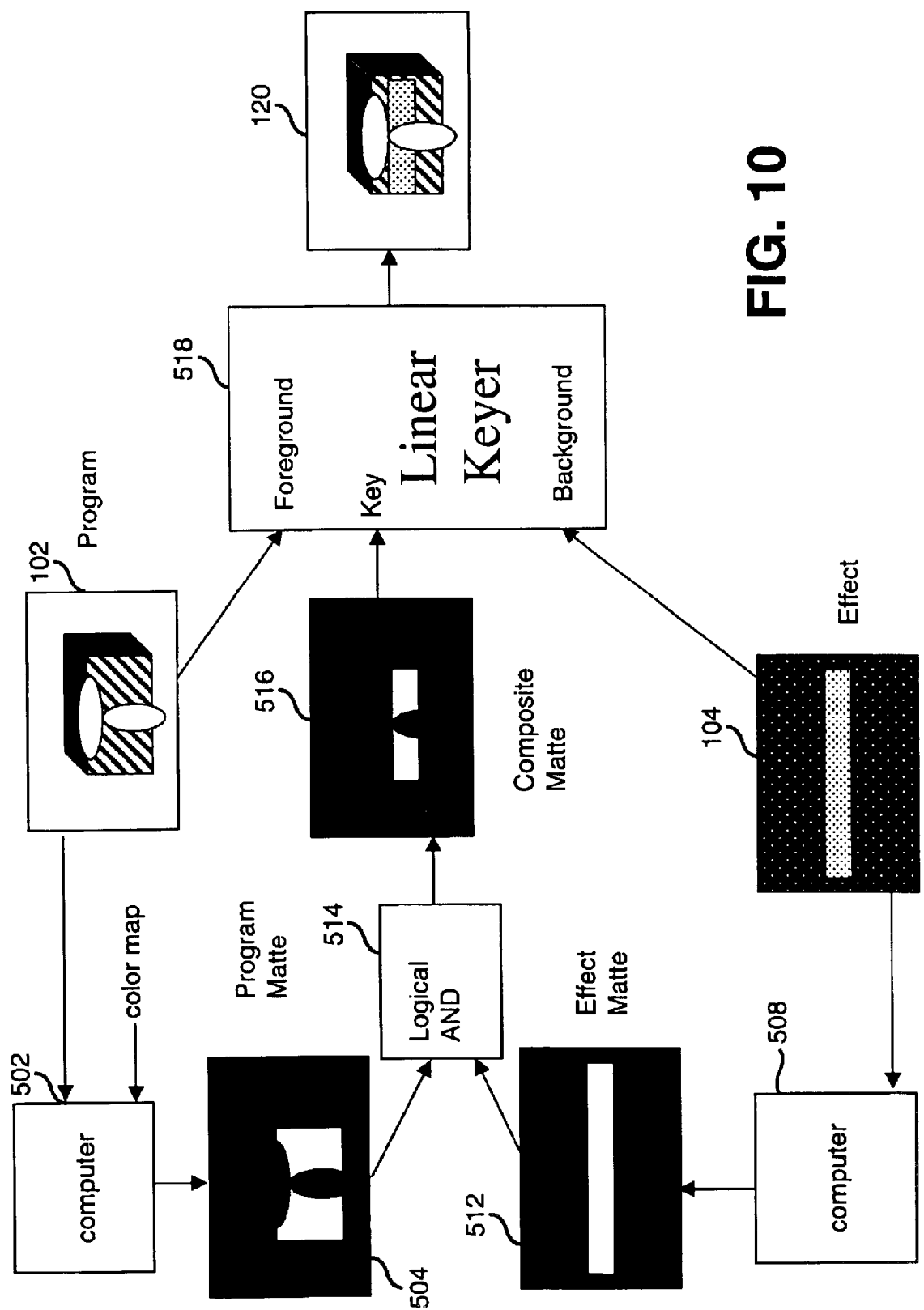
FIG. 10 depicts an alternative embodiment of the present invention.

FIG. 10 depicts an alternative embodiment of the present invention. Program video 102 is communicated to the foreground input of linear keyer 518 and to computer 502. Computer 502 also receives the color map from a memory device connected to computer 502. Based on the color map, computer 502 creates a program matte 504 based on program video 102. The program matte 504 is a gray scale image which includes a data value for each pixel, where the data value corresponds to the alphaFG for the color of the pixel based on the color map. FIG. 10 shows program matte 504 in black and white. However, the matte can also be gray scale. Effect 104 is sent to computer 508 to create an effect matte 512. The effect matte includes an alpha value for each pixel of the effect to indicate how much the effect pixel should be combined in the final composited image. This may be done by testing whether there is a transparent color in the effect. In one embodiment, computer 508 is also the computer that generates effect 104.

Program matte 504 and effect matte 512 are combined using a logical AND operation (or linear combination) 514 to produce a composite matte 516. In one embodiment, composite matte 516 is a video signal with data for each pixel representing which pixels in the program video can be replaced by the effect 104. Composite matte 516 is sent to the key or alpha input of linear keyer 518. Effect 104 is connected to the background input of linear keyer 518. The output of linear keyer 518 is composited video 120.

Figure 11:
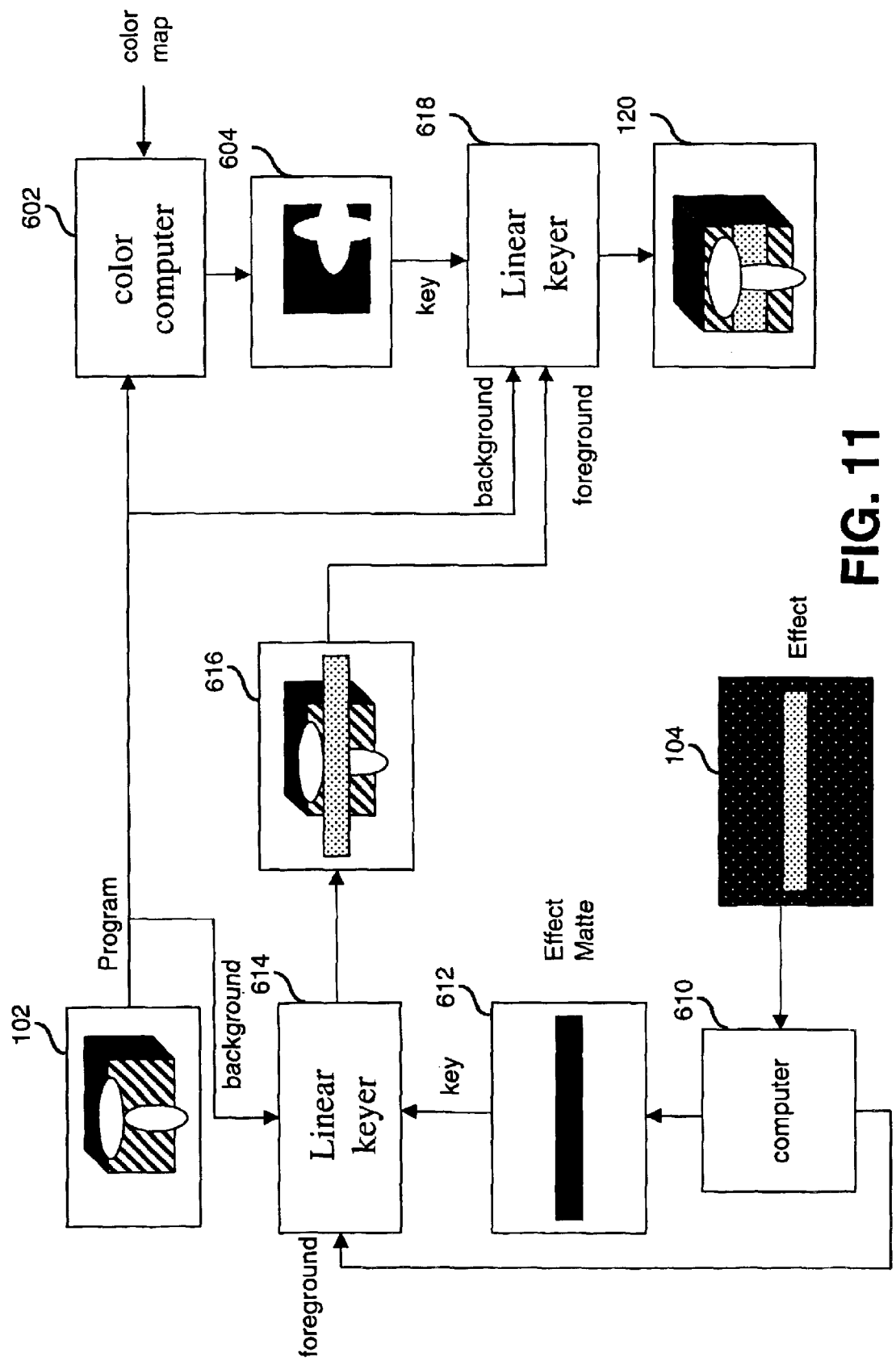
FIG. 11 depicts another alternative embodiment of the present invention.

FIG. 11 provides another alternative embodiment of the present invention. Program video 102 is sent to computer 602, which also is in communication with the color map. Computer 602 produces a program matte 604. Note that program matte 604 of FIG. 11 is an inverted version of program matte 504 of FIG. 10. Effect 104 is sent to compute 610. In one embodiment, effect 104 is created by computer 610. Computer 610 produces an effect matte 612, which is an inverted version of effect matte 512 from FIG. 10. Effect 104 is sent to the foreground input of linear keyer 614. Effect matte 612 is transmitted to the key or alpha input of linear keyer 614. Program video 102 is sent to the background input of linear keyer 614. The output of linear keyer 614 is image 616. As can be seen in FIG. 11, image 616 includes the program video with the image from the effect 104 superimposed on top of the program video. Image 616 is sent to the foreground input of linear keyer 618. Program video 102 is communicated to the background input of linear keyer 618. Program matte 604 is communicated to the key or alpha input of linear keyer 618. The output of linear keyer 618 is composited image 120.

Figure 12:
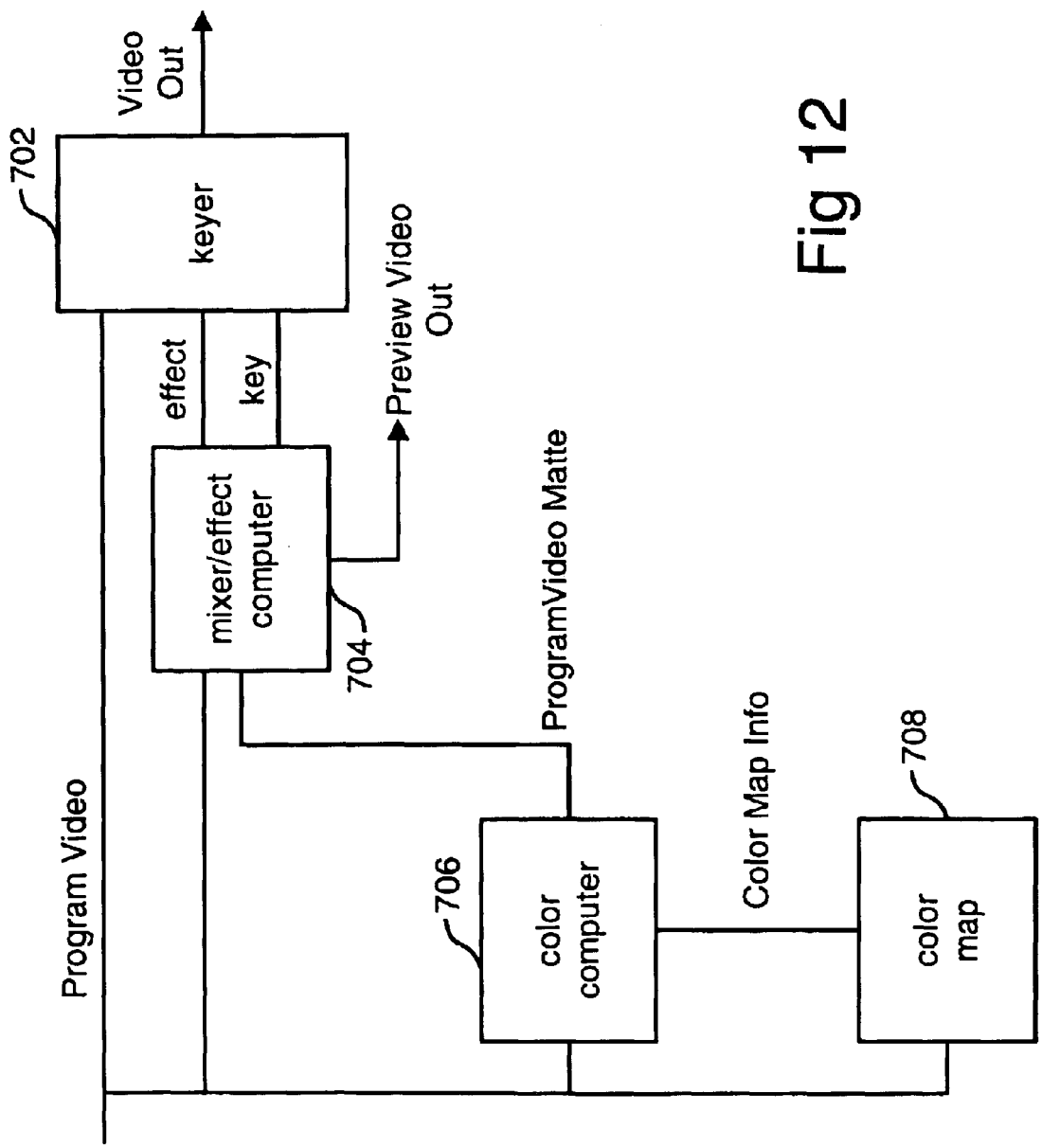
FIG. 12 depicts an additional alternative embodiment of the present invention.

FIG. 12 depicts an additional embodiment of the present invention. The program video (e.g. of a sporting event or other event) is communicated to linear keyer 702, mixer/effect computer system 704, color computer 706 and color map computer system 708. Color map computer system 708 has a GUI for an operator to select inclusions/exclusions and blending values for the inclusions/exclusions. Color map computer system 708, which creates and stores the color map, can be one or more programmed computers. In one embodiment, color map computer system 708 provides the color map data via a serial connection to color computer 706 at a predetermined time interval (e.g. every one second) or when there is a change to the color map.

Based on the color map (as described above), color computer 706 creates a program video matte, which includes gray scale data for every pixel in the program video. For each pixel in the program video matte, color computer determines a blending value. In one embodiment, the blending value is the alphaFG described above. In another embodiment, color computer receives alphaM and the blending value is alpha, described above by equation 1. The program matte is a video signal having fields and frames in accordance with the program video. Thus, for each field in the program video there is a corresponding field in the program video matte signal describing a blending value for each pixel of the program video. Color computer 706 is a personal computer running Windows NT with two video cards, one for video in and one for video out. Alternatively, color computer 706 can be dedicated hardware.

The program video matte signal is communicated from color computer 706 to mixer/effect computer system 704. In one embodiment, mixer/effect computer system 704 creates the effect. In another embodiment, mixer/effect computer system 704 receives the effect from another system. Mixer/effect computer system 704, which can be one or more computers or dedicated hardware, provides the effect video as the foreground to keyer 702. Based on the location of the effect and the program video matte, mixer/effect computer system 704 creates a key signal which is transmitted to keyer 702. The key signal can be created according to Table 1 above, Equations 1 & 2 above or other suitable methods using the technology described above. In one embodiment where mixer/effect computer system 704 creates the effect, there is no need for a transparent color since mixer/effect computer system 704 knows the position of the effect it created. In another alternative, mixer/effect computer system 704 receives alphaM separately from the program video matte in order to create the key signal. Keyer 702 creates the composite video (Video Out in FIG. 12) by blending the Program Video with the Effect according to the key.

Figure 13:
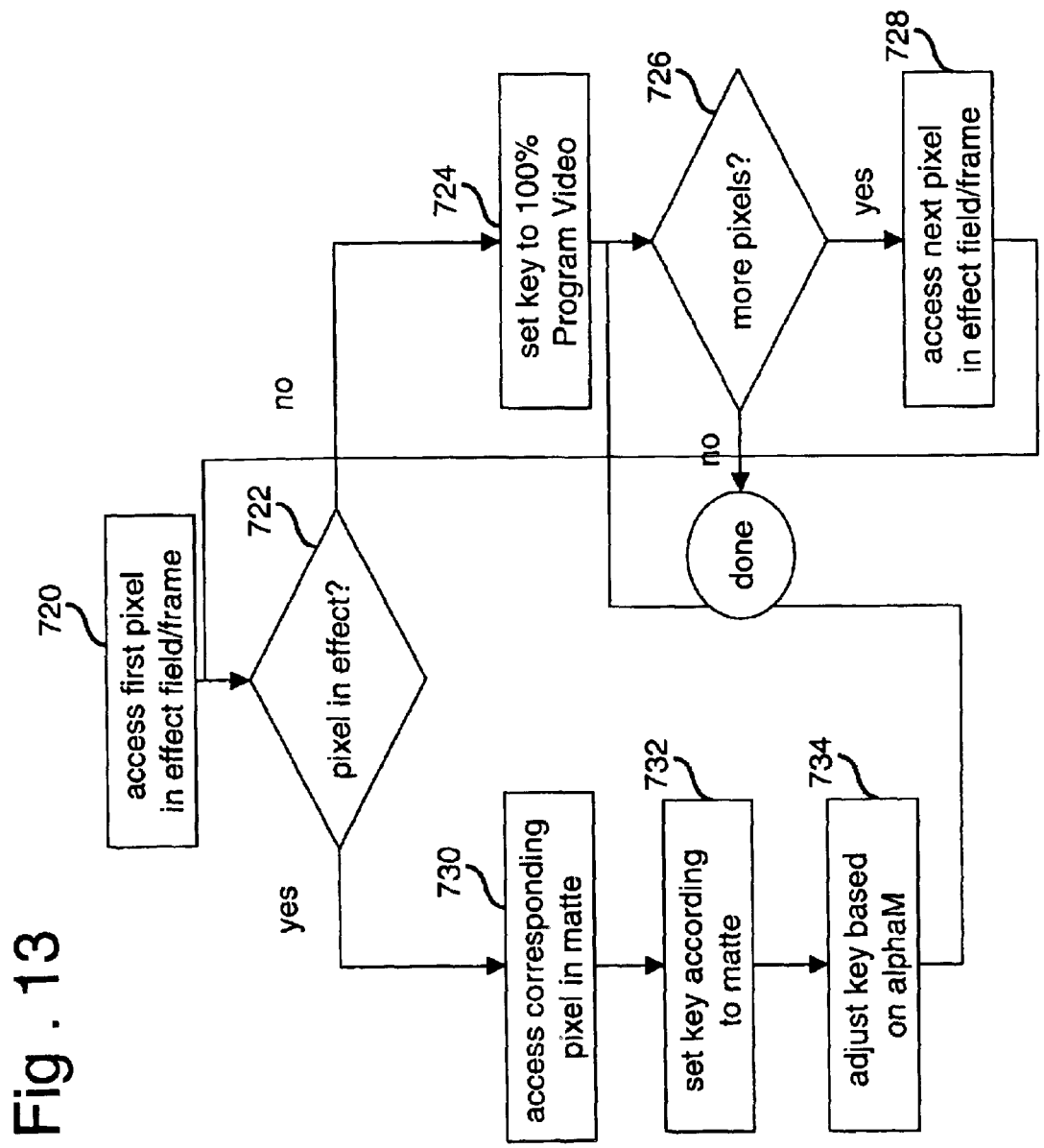
FIG. 13 is a flow chart describing an exemplar method for the embodiment of FIG. 12 and other suitable hardware.

In one embodiment, mixer/effect computer system 704 determines the key signal according to the flow chart of FIG. 13. In step 720, mixer/effect computer system 704 accesses the first pixel in the frame or field of video for the effect. In step 722, it is determined whether the pixel in the frame or field of video for the effect is part of the effect. In one alternative, a pixel with a transparent color is not part of the effect. In other embodiments, transparent colors are not employed. If the pixel is not part of the effect, then in step 724, the value of the key signal for the current pixel is set so that the output of keyer 702 for this pixel is 100% program video pixel. In step 726, it is determined whether there are any more pixels in the frame or field of video for the effect that have not been considered yet. If not, the method of FIG. 13 is done. If there are more pixels in the frame or field of video for the effect to consider, then the next pixel is accessed in step 728 and the method loops back to step 722.

If, in step 722, it is determined that the pixel is part of the effect (e.g. part of the virtual ad or virtual first down line), then the corresponding pixel in the program video matte is accessed in step 730. For example, each pixel in the effect field or frame has a set of coordinates and each pixel value in the program video matte has a set of coordinates. In one alternative, step 730 accesses the pixel data in the program video matte with the same set of coordinates as the pixel in the effect field or frame. The accessed pixel data from step 730 is used to set the key in step 732. In one embodiment, the value of the pixel data in the program video matte is used as the key. In other embodiment, the pixel data is used to derive the key. In step 734, the key is altered according to alphaM. Many embodiments of the present invention do not perform step 734 because alphaM was already used to create the program video matte, alphaM is not used at al, or other suitable reasons. After step 734, the method loops to step 726.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for blending images, comprising:

receiving a first image, said first image includes a first set of pixels;

receiving a second image, said second image includes a second set of pixels and a third set of pixels, said third set of pixels has a predefined attribute indicating that said third set of pixels should not be mixed;

determining which pixels of said second image are part of said second set of pixels and which pixels of said second image are part of said third set of pixels based on said predefined attribute;

for each specific pixel of said first set of pixels that corresponds in position with a pixel from said second set of pixels:
  determining a color of said specific pixel from said first video image,
  accessing a color map after determining said color of said specific pixel, said color map capable of storing blending value information for a plurality of different colors, and
  using said determined color of said specific pixel to determine a pixel blending value for said specific pixel from said color map; and
blending said first set of pixels with said second set of pixels based on said pixel blending values.

2. A method according to claim 1, wherein:
said predefined attribute is a transparent color.

3. A method for blending images, comprising:
receiving a first image, said first image includes a first set of pixels;
receiving a second image, said second image includes a second set of pixels and a third set of pixels, said third set of pixels has a predefined attribute indicating that said third set of pixels should not be mixed;
determining which pixels of said second image are part of said second set of pixels and which pixels of said second image are part of said third set of pixels based on said predefined attribute;
for each specific pixel of said first set of pixels that corresponds in position with a pixel from said second set of pixels, accessing a color map based on color of said specific pixel and determining a pixel blending value for said specific pixel based on said accessing said color map, said color map capable of storing blending value information for a plurality of different colors;
blending said first set of pixels with said second set of pixels based on said pixel blending values; and
updating said color map in real time, said step of blending is performed in real time.

4. A method according to claim 1, further including the step of:
adding additional visibly distinct colors to said color map.

5. A method according to claim 1, wherein:
said second image is part of a video signal;
said step of receiving a second image includes receiving said video signal.

6. A method according to claim 5, wherein:
said predefined attribute is a predefined color; and
said step of determining which pixels of said video signal are part of said second image comprises the step of identifying which pixels of said video signal are said predefined color.

7. A method according to claim 5, wherein:
said predefined attribute is a transparent color; and
said step of determining which pixels of said video signal are part of said second image comprises the step of identifying which pixels of said video signal are said transparent color.

8. A method according to claim 1, wherein:
said first image is part of a first video signal;
said step of receiving a first image includes receiving said first video signal;
said second image is part of a second video signal;
said step of receiving a second image includes receiving said second video signal.

9. A method according to claim 1, wherein:
said color map is a look-up table storing color values and blending information for said color values.

10. A method according to claim 1, wherein:
said color map is a look-up table storing ranges of color values and blending information for said ranges.

11. A method according to claim 1, wherein:
said steps of receiving a first image, receiving a second image, accessing and blending are performed by one apparatus.

12. A method according to claim 1, further including the step of:
receiving additional blending values that are not based on said color map, said step of blending is also based on said additional blending values.

13. A method according to claim 12, wherein:
said additional blending values indicate whether to ignore said pixel blending values.

14. A method according to claim 1, wherein said step of blending includes the steps of:
creating a matte of said second image;
performing a logical AND of said matte and values based on said pixel blending values; and
keying said second image with said first image using a key equal to said logical AND of said matte and said values based on blending values.

15. A method according to claim 1, wherein said step of blending includes the steps of:
creating a matte of said second image;
creating a first composited image by keying said second image with said first image using said a key equal to said matte; and
creating a second composited image by keying said first composited image with said first image.

16. A method according to claim 1, wherein:
said method is performed in real time during a live event.

17. A method according to claim 1, wherein said step of blending includes the steps of:
creating a matte based on said pixel blending values, said matte includes a fourth set of pixels, each pixel in said fourth set of pixels includes a data value, each data value is based on at least a corresponding pixel blending value; and
mixing said first image with said second image on a pixel by pixel basis using said matte.

18. A method according to claim 1, wherein:
said step of using said determined color of said specific pixel to determine a pixel blending value includes reading said pixel blending value from said color map.

19. A method according to claim 1, wherein:
said step of using said determined color of said specific pixel to determine a pixel blending value includes reading color data from said color map and calculating said pixel blending value from said color data.

20. An apparatus used for blending images, comprising:
an input device;
an output device;
memory; and
one or more processors, said one or more processors perform a method comprising the steps of:
  receiving a first image, said first image includes a first set of pixels,
  receiving a second image, said second image includes a second set of pixels and a third set of pixels, said third set of pixels has a predefined attribute indicating that said third set of pixels should not be mixed, determining which pixels of said second image are part of said second set of pixels and which pixels of said second image are part of said third set of pixels based on said predefined attribute, for each specific pixel of said first set of pixels that corresponds in position with a pixel from said second set of pixels:

determining a color of said specific pixel from said first video image, accessing a color map after determining said color of said specific pixel, said color map capable of storing blending value information for a plurality of different colors, and using said determined color of said specific pixel to determine a pixel blending value for said specific pixel from said color map, and causing a blending of said first set of pixels with said second set of pixels based on said pixel blending values.

21. An apparatus according to claim 20, wherein said predefined attribute is a transparent color.

22. An apparatus according to claim 20, wherein said method further includes the step of:

updating said color map in real time, said step of blending is performed in real time.

23. An apparatus according to claim 20, wherein said method further includes the step of:

adding additional visibly distinct colors to said color map.

24. An apparatus according to claim 20, wherein:

said step of determining which pixels of said video signal are part of said second image comprises the step of identifying which pixels of said video signal are a predefined color.

25. An apparatus according to claim 20, wherein said method further includes the step of:

receiving additional blending values that are not based on said color map, said step of blending is also based on said additional blending values, said additional blending values indicate whether to ignore said pixel blending values.

26. An apparatus used for blending images, comprising:

an input device;

an output device;

memory; and one or more processors, said one or more processors perform a method comprising the steps of:

receiving a first image, said first image includes a first set of pixels, receiving a second image, said second image includes a second set of pixels and a third set of pixels, said third set of pixels has a predefined attribute indicating that said third set of pixels should not be mixed, determining which pixels of said second image are part of said second set of pixels and which pixels of said second image are part of said third set of pixels based on said predefined attribute, for each specific pixel of said first set of pixels that corresponds in position with a pixel from said second set of pixels, accessing a color map based on color of said specific pixel and determining a pixel blending value for said specific pixel based on said accessing said color map, said color map capable of storing blending value information for a plurality of different colors, causing a blending of said first set of pixels with said second set of pixels based on said pixel blending values, said step of causing a blending includes creating a matte based on said pixel blending values and mixing said first image with said second image on a pixel by pixel basis using said matte, said matte includes a fourth set of pixels, each pixel in said fourth set of pixels includes a data value, each data value is based on at least a corresponding pixel blending value.

27. A method for blending images, comprising the steps of:

storing blending information for a set of visibly distinct colors;

receiving a first image, said first image includes a first set of pixels, each pixel of said first set of pixels is associated with color data;

receiving a second image, said second image includes a second set of pixels;

for each pixel in said first set of pixels, identifying an appropriate subset of said stored blending information based on said color data;

creating a matte, said matte includes a third set of pixels, each pixel in said third set of pixels corresponds to at least one pixel in said first set of pixels, each pixel in said third set of pixels includes a data value based on said appropriate subset of said stored blending information for said corresponding at least one pixel in said first set of pixels; and causing a blending of said first image with said second image based on said matte.

28. A method according to claim 27, wherein:

said matte is a gray scale image that is part of a video signal.

29. A method according to claim 27, wherein:

said first image is a video image; and said second image is a video image.

30. A method according to claim 27, wherein:

said blending information includes a color map, said color map stores an identifications of colors and blending values for said colors.

31. A method according to claim 30, wherein:

each data value stores one of said blending values.

32. A method according to claim 31, wherein:

said step of causing a blending includes the steps of creating an alpha signal based on said matte and transmitting said alpha signal to a keyer;

said first image is a video image; and said second image is a video image.

33. A method according to claim 27, wherein said step of causing a blending includes the steps of:

accessing a first pixel of said second image;

determining whether said first pixel of said second image is part of an effect;

outputting a first pixel of said first image, without blending, if said pixel is not part of said effect;

outputting a blend of said first pixel of said first image and said first pixel of said second image according to a first a data value in said matte if said first pixel of said second image is part of said effect, said first data value corresponds to a first pixel of said matte, said first pixel of said matte corresponds to said first pixel of said first image and said first pixel of said second image.

34. A method according to claim 27, further comprising the steps of:

receiving a third image;

displaying said third image;

receiving a selection of a portion of said third image, said portion of said third image includes a set of colors; and receiving one or more blending values for said set of colors, said stored different blending information includes said blending values.

35. An apparatus used for blending images, comprising:

an input device;

an output device;

memory; and one or more processors, said one or more processors, said one or more processors perform a method comprising the steps of:

storing blending information for a set of visibly distinct colors, receiving a first image, said first image includes a first set of pixels, each pixel of said first set of pixels is associated with color data, receiving a second image, said second image includes a second set of pixels, for each pixel in said first set of pixels, identifying an appropriate subset of said stored blending information based on said color data, creating a matte, said matte includes a third set of pixels, each pixel in said third set of pixels corresponds to at least one pixel in said first set of pixels, each pixel in said third set of pixels includes a data value based on said appropriate subset of said stored blending information for said corresponding at least one pixel in said first set of pixels, and causing a blending of said first image with said second image based on said matte.

36. An apparatus according to claim 35, wherein said step of causing a blending includes the steps of:

accessing a first pixel of said second image;

determining whether said first pixel of said second image is part of an effect;

outputting a first pixel of said first image, without blending, if said pixel is not part of said effect;

outputting a blend of said first pixel of said first image and said first pixel of said second image according to a first a data value in said matte if said first pixel of said second image is part of said effect, said first data value corresponds to a first pixel of said matte, said first pixel of said matte corresponds to said first pixel of said first image and said first pixel of said second image.

37. An apparatus according to claim 35, wherein:

said matte is a gray scale image that is part of a video signal.

38. An apparatus according to claim 35, wherein:

said blending information includes a color map, said color map stores an identifications of colors and blending values for said colors.

39. An apparatus for blending a first video image with a second video image, comprising:

a pixel blending value calculation circuit receiving said first video image, said pixel blending value calculation circuit includes a color map, said color map stores information indicating blending values for multiple visibly distinct colors, said pixel blending value calculation circuit generates an output by:

determining color in said first video image, accessing said color map after determining said color in said first video image, and using said determined color in said first video image to determine a pixel blending value from said color map for at least a portion of said first video image; and a blending circuit receiving said first video image and said second video image, said pixel blending circuit in communication with said pixel blending value calculation circuit, said blending circuit mixes said first video image with said second video image based on said output of said pixel blending value calculation circuit.

40. An apparatus according to claim 39, wherein said blending circuit comprises:

control logic in communication with said pixel blending value calculation circuit;

a first video altering circuit receiving said first video image, said first video altering circuit is in communication with said control logic, said first video altering circuit alters said first video image based on a first set of one or more blending variables received from said control logic;

a second video altering circuit receiving said second video image, said second video altering circuit is in communication with said control logic, said second video altering circuit alters said second video image based on a second set of one or more blending variables received from said blending control logic; and a mixing circuit in communication with said first video altering circuit and said second video altering circuit.

41. An apparatus according to claim 39, wherein said pixel blending value calculation circuit comprises:

a memory, said memory stores said color map; and a processor in communication with said memory, said processor receives said first video image, and generates said output by determining said color in said first video image, accessing said color map, and using said determined color to determine a pixel blending value.

42. An apparatus according to claim 39, wherein:

said pixel blending value calculation circuit receives a geometric key signal, said pixel blending value calculation circuit selectively ignores said color map for a given pixel in said first video image in response to said geometric key signal.

43. An apparatus according to claim 39, wherein:

said pixel blending value calculation circuit selectively ignores said color map for a particular pixel in said first video image if said particular pixel is of a predetermined color.

44. An apparatus according to claim 39, wherein:

said pixel blending value calculation circuit accesses said color map for every pixel of said first video image and generates an output based on said color map for every pixel of said first video image.

45. An apparatus for blending a first video signal with a second video signal, comprising:

a memory, said memory stores a color map, said color map stores information indicating blending information for multiple colors;

a processor in communication with said memory, said processor receives said first video signal, determines colors in said first video signal, accesses said color map after determining said colors in said first video signal, and uses said determined colors in said first video signal to determine blending values from said color map; and a video blending circuit in communication with said processor, said video blending circuit receives said first video signal and said second video signal, said video blending circuit mixes said first video signal with said second video signal based on said blending values.

46. An apparatus according to claim 45, wherein said blending circuit comprises:

control logic in communication with said processor;

a first video signal altering circuit receiving said first video signal, said first video signal altering circuit is in communication with said control logic, said first video signal altering circuit alters said first video signal based on a first set of one or more blending values received from said control logic;

a second video signal altering circuit receiving said second video signal, said second video signal altering circuit is in communication with said control logic, said second video signal altering circuit alters said second video signal based on a second set of one or more blending values received from said control logic; and a video blending circuit in communication with said first video signal altering circuit and said second video signal altering circuit.

47. An apparatus according to claim 45, wherein:

said processor receives a geometric key signal, said processor selectively ignores said color map for a given pixel in said first video image in response to said geometric key signal.

48. An apparatus according to claim 45, wherein:

said processor selectively ignores said color map for a particular pixel in said first video image if said particular pixel is of a predetermined color.

49. An apparatus according to claim 45, wherein:

said processor accesses said color map for every pixel of a first image in said first video signal and generates an output based on said color map for every pixel of said first image.

* * * * *